United States Patent
Leivo et al.

(10) Patent No.: US 6,782,080 B2
(45) Date of Patent: Aug. 24, 2004

(54) ARRANGEMENT FOR AUTHENTICATING USER AND AUTHORIZING USE OF SECURED SYSTEM

(75) Inventors: Mika Leivo, Helsinki (FI); Mika Honkanen, Helsinki (FI); Juha-Matti Linkkonen, Helsinki (FI)

(73) Assignee: ICL Invia Oyj, Helsinki (FI)

( * ) Notice: Subject to any disclaimer, the term of this patent is extended or adjusted under 35 U.S.C. 154(b) by 0 days.

(21) Appl. No.: 10/320,602

(22) Filed: Dec. 17, 2002

(65) Prior Publication Data

US 2003/0128822 A1 Jul. 10, 2003

Related U.S. Application Data

(63) Continuation of application No. PCT/FI01/00591, filed on Jun. 20, 2001.

(30) Foreign Application Priority Data

Jun. 22, 2000 (FI) .............................................. 20001497
Feb. 15, 2001 (FI) .............................................. 20010291

(51) Int. Cl.⁷ ........................................... H04M 11/00
(52) U.S. Cl. ............................... 379/93.04; 379/93.02; 379/142.05; 455/411
(58) Field of Search .................... 379/93.02–93.04, 379/142.05, 142.06; 455/411, 456; 380/33; 713/155, 200, 201

(56) References Cited

U.S. PATENT DOCUMENTS 5,003,595 A * 3/1991 Collins et al. ................. 707/9
5,181,238 A * 1/1993 Medamana et al. ...... 379/93.03
5,737,414 A * 4/1998 Walker et al. ................ 705/40
6,012,049 A * 1/2000 Kawan ......................... 705/41

FOREIGN PATENT DOCUMENTS

| EP | 0 817 518 A2 | 1/1998 |
|---|---|---|
| FR | 2 795 897 | 1/2001 |
| WO | WO 98/06199 | 2/1998 |
| WO | WO 99/44114 | 9/1999 |
| WO | WO 00/03316 | 1/2000 |
| WO | WO 01/17310 | 3/2001 |
| WO | WO 01/52205 | 7/2001 |

* cited by examiner

*Primary Examiner*—Wing F Chan
(74) *Attorney, Agent, or Firm*—Young & Thompson

(57) ABSTRACT

A method for real-time authentication or authorization of a user (1) of a secured system (3) is based on using two authentication channels and an authentication device (4) from which the secured system can request authentication or authorization (6) over a secured information network connection (6, 9). One of the authentication channels is a telephone network (8), to which the authentication device (4) is connected. A user logging into the secured system (3) over the other channel (6) of the authentication channels must make a call to the authentication device over the telephone network by his or her telephone (2). The authentication device verifies that a call has been received from a telephone number of the user's telephone, and issues a positive verification response to the secured system. Upon receiving a positive response, the secured system provides a requested service through the other channel.

16 Claims, 1 Drawing Sheet

ARRANGEMENT FOR AUTHENTICATING USER AND AUTHORIZING USE OF SECURED SYSTEM

RELATED APPLICATIONS

This is a continuation of the International PCT application PCT/FI01/00591 filed Jun. 2, 2001.

BACKGROUND OF THE INVENTION

The invention relates to a method for authenticating a user of a secured system and to a method for verifying a user right. A general need currently exists for security and billing in different applications, such as e-commerce, confidential or licensed web contents, etc. The authentication methods of a user of a secured system currently being used require either special equipment, e.g. a separate identification card or such a device, or personal procedures. A single channel is typically used for delivering identification information, which makes the authentication more vulnerable and requires e.g. one-time identifiers or a strong and heavy encryption method, such as a Public Key Infrastructure (PKI) to be used.

Dual channel methods, which use e.g. a telephone network and an information network, currently require identification information to be entered manually into the system either by a service provider or the user, which also puts the information at risk of being lost or copied and, in the case of the service provider, requires personnel procedures.

Current single-channel payment and access control systems utilizing a telephone network bind subscriber number B to a single device.

DISCLOSURE OF THE INVENTION

An object of the invention is to provide a new authentication and verification solution.

This object is achieved by arrangements according to claims 1, 12 and 17, devices according to claims 19 and 20, and a secured system according to claim 21. Preferred embodiments of the invention are disclosed in the dependent claims.

The invention enables a user of an information system, or another system controlled by such, e.g. web pages, to be authenticated or a user right to be verified (authorization). The method is based on using two independent authentication channels. One channel is a telephone network and the identifiers of terminals connected thereto. The other channel can be an information network connection or another user interface of a secured system.

The method can be applied e.g. to real-time management of user rights of information networks and systems and as support for authentication and charging mechanisms required by e-commerce. Other applications include e.g. access control for buildings and centralized billing of use of chargeable devices.

When the invention is used for authenticating a user, thanks to the use of two independent authentication channels, the invention enables a safer authentication compared to single-channel authentication, reducing the need for different one-time identifiers and separate authentication devices and strong encryption to be used. However, one-time identifiers can be applied in order to enhance security.

When the invention is used for verifying a user right (authorization), the invention makes services easier to use and it enables a confirmation to be generated and delivered to a secured system without any procedures being required from the user and without the user having any information about the confirmation.

The invention also enables billing of a plurality of services to be tied to a single point. In other words, a single authentication device based on a telephone network can be used e.g. for all application communication channels of a web server or for a plurality of servers. The access control and charging processes of many automatic service machines (such as vending machines) can be carried out in a centralized manner with no need for device-specific solutions.

If the invention is used in combination with conventional security solutions, the user can authenticate himself or herself and sign events using different security solutions and products and select a solution that suits a given situation best. For example, the user can at home use a smart card on his or her personal computer (PC) and the authentication of the invention on his or her mobile station when not at home.

BRIEF DESCRIPTION OF THE DRAWINGS

In the following, the invention will be described in closer detail by means of working examples and with reference to the accompanying drawings, in which.

DETAILED DESCRIPTION OF THE INVENTION

Figure 1:
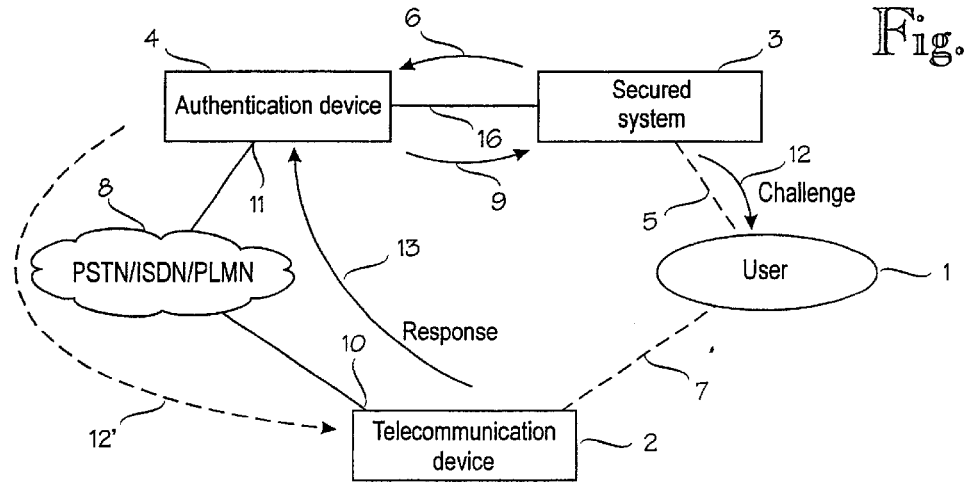
FIG. 1 is a schematic block diagram illustrating a logical structure of systems applying the invention.

The systems and devices related to the invention are schematically shown in FIG. 1. A secured system 3 provides a service requiring authentication and/or verification of a user right. The secured system can be e.g. an Internet server (web server) providing a user 1 with access to a company's internal intranet site by a browser program over an Internet connection 5 through a public information network. The secured system 3 can also be e.g. a vending machine wherein payments can be paid by mobile telephone, or a security system of a building wherein a door is unlocked using authentication carried out through a mobile telephone. The secured system 3 has a secured information network connection 16 to an authentication device 4, e.g. a computer equipped with an ISDN connection, connected to a telephone network PSTN/ISDN/PLMN 8. It is to be noted that although FIG. 1 only shows one secured system 3, an unlimited number of secured systems can in principle be connected to the authentication device 4. In FIG. 1, the user 1 represents a user (using e.g. a user interface 5 of a vending machine) and/or his or her data terminal (such as a personal computer PC equipped with a web browser), and an information network connection 5 to the secured system. The user 1 further has in his or her possession a telecommunication device 2, which enables a call from the user 1 to the authentication device 4, or vice versa. Typically, the telecommunication device is a separate telephone device, such as a mobile telephone (e.g. GSM) or a PSTN telephone. The telecommunication device 4 and the user's data terminal may be a single device, e.g. a mobile telephone, which enables a connection to be set up both to the data network and the telephone network.

In the following, the basic principles of the invention for authenticating a user and verifying a user right and the application thereof e.g. to a paying process will be described with reference to FIG. 1.

As used herein, subscriber number A refers to the subscriber number of a calling party, and subscriber number B refers to the subscriber number of a called party.

Examine first an example of user authentication. The invention is based on a challenge-response authentication sequence utilizing a call. When the user 1 of a service tries to access contents or services that require authentication, according to the invention, the user is given an authentication challenge 12, to which the user is to reply in a acceptable manner in order to pass a security check.

The challenge 12 is issued from the secured system 3 usually through the same channel 5 as is used by the user 1 when he or she tries to access the secured system 3. The channel 5 may be either any telecommunication connection, such as a secured Internet connection, or another user interface of the secured system 3. When the user 1 tries to access a web site, the challenge 12 is usually presented by the user interface of the web browser. When the user 1 is purchasing an item e.g. from a vending machine, the channel and the user interface on which the challenge 12 is being presented can be the user interface of the vending machine, e.g. a display. In some embodiments of the invention, the challenge can also be transmitted from the authentication device 4 such that the authentication device 4 sets up a call to the telecommunication device 2 of the user, as shown by broken line 12' in FIG. 1.

The authentication challenge 12 or 12' can be given in many different forms, depending on the application. Some examples will be given in the following:

A silent challenge. The user is expected to know that a challenge has been issued but no visible evidence is given on this. The user has to know a correct response in advance. This is suitable primarily for challenges 12 issued through the channel 5.

A default challenge shows the user a telephone number to which he or she is to carry out the authentication. This is primarily suitable for challenges 12 issued through the channel 5.

A PIN challenge adds a request for the authentication PIN of the user to be entered through the keypad of a telephone. This is suitable for challenges 12 and 12' issued both through the channel 5 and a call.

A variable challenge presents a one-time PIN and/or a one-time telephone number for the authentication. The user has to dial a given telephone number and enter a given PIN in order to authenticate himself or herself. A one-time PIN is also suitable for challenges 12' issued through a call.

An authentication response is always carried out over a telephone line, e.g. using a mobile telephone. A basic authentication process can take place in two alternative ways: 1) the user 1 makes a call to a certain telephone number and the authentication device 4 verifies the event, or 2) the authentication device 4 makes a call to the telephone number of the telecommunication device 2 of the user 1, the user 1 answers and the authentication device 4 verifies the event. In the first alternative, the confirmation process at least comprises the authentication device 4 comparing the telephone number (subscriber number A) of the user 1 to the authorized users in a database or to subscriber number A received from the secured system 3. The call from the user 1 is preferably time-limited, which means that it should take place shortly after the challenge 12 has been issued, during a predetermined period of time.

A challenge 13 is also provided with different alternative forms. Some examples will be given in the following:

At its simplest, authentication consists of calls that are made from a user's telephone 2 to a dial-in number of an authentication device. The user does not deliver any additional information, and the call does not even necessarily have to be connected, because the authentication device is able to identify the subscriber number from the incoming call by means of signalling, without answering the call (using e.g. a Calling Line Identification Presentation (CLIP) function of a telephone network). Typically, the call is made to a telephone number which is given in the challenge 12. The authentication device 4 may be provided with any number of dial-in numbers, one of the numbers at a given time being given to the user for authentication. More than one dial-in number also enables an extensive billing system to be created. Each telephone number can have a certain call charge and the numbers can be associated with different services provided by the secured system. A call to a number provided in a challenge in connection with a service results in a certain charge for the service. Security can be further improved if the dial-in number given to the user in a challenge is one-time. Being one-time means e.g. that a number is allotted pseudo-randomly for each authentication process from among a large number of telephone numbers (e.g. 10 000) or from a large number space.

Blind dialling to a predetermined number after a silent challenge is preferable because no information about a call having to be set up and which telephone number to dial is transmitted over the channel 5 together with the challenge. The user has to know in advance the telephone number to be dialled and the potential further information given as an authentication response. Blind dialling is particularly usable when the secured system 3 has no way to present the details of a dialling request to the user or it is for security reasons not advisable to do so.

In more complex authentication responses 13, also other information in addition to the call is required from the user. The most typical example of such other information is a PIN code. In such a case, the authentication device 4 first accepts the call and then registers the PIN code entered by the user 1. A PIN can be a fixed PIN given to the user or a one-time PIN generated by the authentication device 4 or the secured system for this particular authentication attempt and given to the user 1 in the challenge 12. A PIN may also be a one-time PIN from a predetermined sequence, in which case no PIN code is presented to the user 1 over the channel 5 either. The PIN sequence is known both to the user 1 and the authentication device 4.

Instead of or in addition to a PIN code, other information required by authentication may also comprise other data. Such data may be e.g. biometric data, such as real-time audio for voice print identification or a fingerprint scan result.

Another basic type of authentication is a call from the authentication device to the telephone number of the user 1, i.e. to the telecommunication device 2. In other words, when the user 1 tries to access the secured system 3 through the channel 5, the system 3 gives the authentication device 4 the telephone number of the user 1 and requests the number to be called through the telephone network. Simultaneously, the secured system 3 may give the user 1 the challenge 12 to provide e.g. the PIN code. The authentication device 3 calls the given telephone number. When the user 1 answers, he or she enters the PIN code without any separate prompt (the silent challenge 12') or after receiving a prompt. Having succeeded in calling the given telephone number and having received a correct response (e.g. a PIN code), the authentication device 4 informs the secured system 3 of the successful authentication, the secured system then allowing the user to access the system through the channel 5 or e.g. delivering a purchased service or item. If the verification fails or the user does not call within a given time limit, the authentication device 4 informs the secured system 3 of the negative verification result, and the secured system prevents the user from accessing the desired material through the channel 5 or does not deliver the desired service or item.

In the following, a simple authentication process by means of an example will be examined. Assume that the secured system 3 is a web server providing a free service which requires authentication, e.g. access to a company's internal intranet site through a public information network. The user 1 wishes to view the contents of the secured web pages using his or her browser program over the Internet connection 5. The secured system 3 has the secured information network connection 16 to an authentication device, e.g. to a computer equipped with an ISDN connection, connected to the telephone network 8. A viewing request issued by the user 1 through the connection or user interface 5 makes the secured system 3 require a user identifier (UserID) registered in advance in the system 3, and optionally a password, such as a personal identification number (PIN), from the user 1. This takes place for example such that the web server presents a login form to the user such that he or she can enter the user identifier and the password. The user identifier is checked, and if the user login is successful, pre-registered subscriber number A corresponding to the user identifier is delivered to the authentication device 4 in a verification request 6. Through the channel 5, the secured system 3 indicates to the user 1 subscriber number B 11, which is the dial-in number of the authentication device 4. Using the telecommunication device 2 in his or her possession 7, e.g. a GSM telephone, the user 1 calls subscriber number B 11 indicated by the secured system 3, in which case a call is established to the authentication device 4. The authentication device 4 detects call signalling of the incoming call from the ISDN connection to predetermined subscriber number B 11 from predetermined subscriber number A 10 and informs 9 the secured system 3 that verification has taken place. When the authentication device 4 has verified the user, the secured system 3 allows the user to use the desired service, such as to view the desired secured page. If the verification fails or the user does not call within the time limit, the authentication device 4 informs the secured system 3 of the negative verification result, and the secured system prevents the user from accessing the desired material through the channel 5.

The invention has been described above in connection with authentication (subscriber identification), but all the principles described can also be used for verifying user rights and authorizing, with or without authentication. Authorization also refers e.g. to settling a payment in order to be allowed to access a secured system. In such a case, the identity of the user is not necessarily a matter of interest.

In the following, an example of an authorization process will be described. Assume that the system 3 secured according to the invention is a web server, which provides a chargeable service that does not require authentication, e.g. chargeable web pages of a newspaper. The user 1 wishes to view the contents of the chargeable web pages using his or her browser program over the Internet connection 5. The secured system 3 is connected to the authentication device 4, e.g. a computer equipped with an ISDN connection, connected to the telephone network 8 by the secured information network connection 16. The viewing request issued by the user 1 makes the secured system 3 indicate chargeable subscriber number B 11 and optionally a PIN code to the user 1 and transmit a user right verification request 6 to the device 4. Using the telecommunication device 2 in his or her possession 7, e.g. a GSM telephone, the user 1 makes a call to subscriber number B 11 indicated by the secured system 3. The authentication device 4 detects call signalling of the incoming call from the ISDN connection to predetermined subscriber number B 11 and, using a confirmation message 9, informs the secured system 3 that the call made to chargeable subscriber number B 11 has been received. If a PIN code or other data is also required from the user, the authentication device 4 answers the call and receives the PIN code entered by the user. In addition, the authentication device 4 may announce a predetermined voice message to the connection. Consequently, the secured system 3 allows the user 1 to access the chargeable web contents.

All different challenge, response, dial-in, calling back, PIN code and other such variations described above can also be applied to these authentication and authorizing examples.

The basic principles of the invention described above can be applied to many applications. Typical applications relate to access control and operation authorization and payment procedures possibly attached thereto. In addition, some applications may include utilization of a separate authentication channel for different additional functions.

Intranet access control and use of chargeable web pages (or web service) have already been described above as applications. Transfer of biometric data (e.g. a voice sample of a user) has also been mentioned in connection with authentication or authorization during a call.

Figure 2:
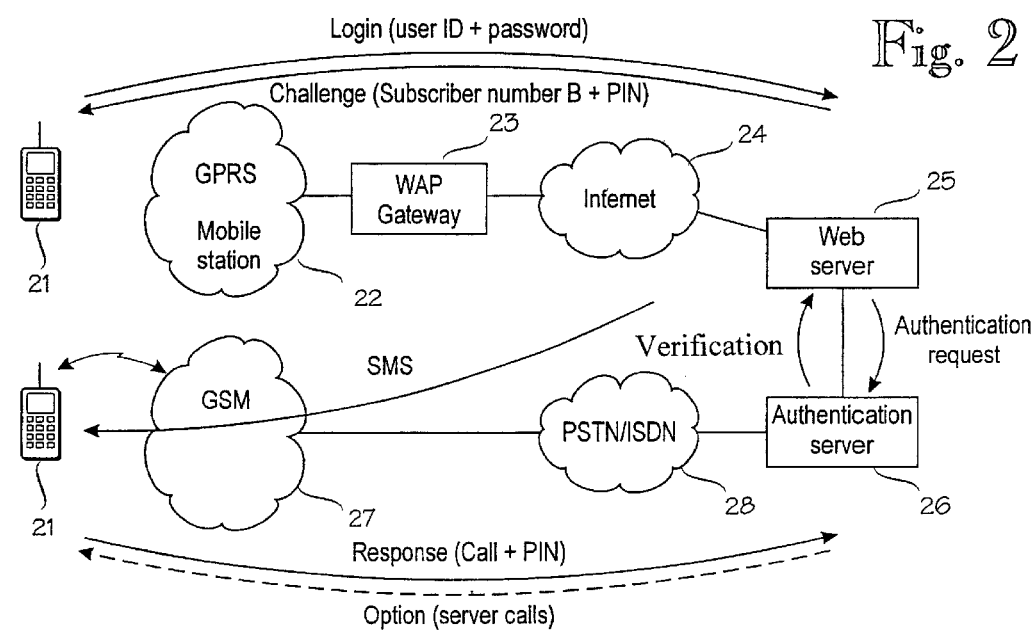
FIG. 2 illustrates an application wherein the same physical subscriber device is used both for application communication through a data connection and for identifying and authenticating through a telephone connection.

FIG. 2 illustrates an application wherein the same physical subscriber device is used both for application communication through a data connection and for identification and authentication through a telephone connection. In FIG. 2, a mobile station 21 is a telephone device which is capable of operating both in a conventional GSM network on a circuit-switched connection and in a General Packet Radio Service (GPRS) network in packet-switched data transmission. The GPRS is a packet-switched data service, which has originally been developed as a supplementary service for a GSM network. The GPRS utilizes the base transceiver station system of the GSM network, i.e. it has a similar radio interface to that of the GSM. A similar GPRS service will also be introduced for the third generation mobile communication networks wherein, however, the radio interface is provided by a third generation Radio Access Network (RAN). The GSM/GPRS telephone 21 is a telephone which is capable of operating simultaneously both in the GSM mode (making and receiving circuit-switched calls through a GSM network) and in the GPRS mode (transmitting packet-mode data through a GPRS system). In FIG. 2, a GPRS system 22 is further connected to the Internet 24 through a WAP gateway 23. A Wireless Application Protocol (WAP) service is a transmission protocol developed for wireless terminals, wherein a micro-browser located in a terminal enables WAP pages to be retrieved from special WAP servers or, at least in principle, from any Internet web-server through the WAP gateway 23. As distinct from conventional World Wide Web (WWW) pages wherein HyperText Markup Language (HTML) is typically used, a WAP page is written in Wireless Markup Language (VML). When necessary, the WAP gateway 23 converts (filters) a WWW page retrieved from the Internet into a WAP page before the page is downloaded to the wireless terminal 21.

The GPRS and WAP technologies are well known in the art, and since the invention does not as such relate to these technologies, they will not be described in closer detail herein. Assume that the GSM/GPRS telephone 21 establishes a WAP connection through the GPRS system 22 to a web server 25 connected to the Internet 24. First, the web server 25 shows the user a page for a login procedure to be performed. In other words, the user is requested to enter a user id and a password. The user enters the requested information and if the server 25 accepts this information, it shows the user of the telephone 21 a PIN code and subscriber number B which the user is to call for authentication. At the same time, the server 25 issues an authentication request, which contains the telephone number (subscriber number A) of the telephone 21 and said PIN code, to an authentication server 26. Through a GSM network 27 (and possibly through PSTN/ISDN networks 28), the user of the telephone 21 makes a GSM call to subscriber number B given to the authentication server 26 and gives the server 29 said PIN code. The authentication server 26 verifies the response call from the user and informs the web server 25 of the confirmation, as described above. An alternative to the call made by the telephone 21 is that the authentication server 26 calls the telephone 21, in which case the user provides the PIN code.

The invention can also be applied to small on-line payments, which are herein called micro payments. The user may purchase e.g. a new operator logo and ringtone for his or her mobile telephone in the following manner. The user browses the logos and ringtones on a vendor's web page, selects the one/s he or she wants and initiates the purchase function. This may take place e.g. through the GPRS/WAP connection of FIG. 2 from the web server 25. The web server 25 gives the authentication server 26 an authentication request, which indicates the fee for the selection made by the user. The authentication server 26 generates a suitable challenge for the user. This means that the authentication server 26 selects a telephone number to be contained in the challenge so that the price of a call made to this telephone number corresponds to the charge incurred by the selected logo and ringtone. In order to further associate a certain user with this transaction, the authentication server 26 also generates a one-time PIN code. The challenge thus generated is returned to the web server 26, which further presents it to the user on the display of the telephone 21. When, using the telephone 21, the user makes a call through the GSM network to the given telephone number and enters the given PIN code, the payment has been settled (in the telephone bill). The authentication server 26 informs the web server 25 that the payment is settled, and the web server 25 transmits the purchased logo and ringtone as Short Message Service (SMS) messages to the telephone 21 through the GSM network 27.

Figure 3:
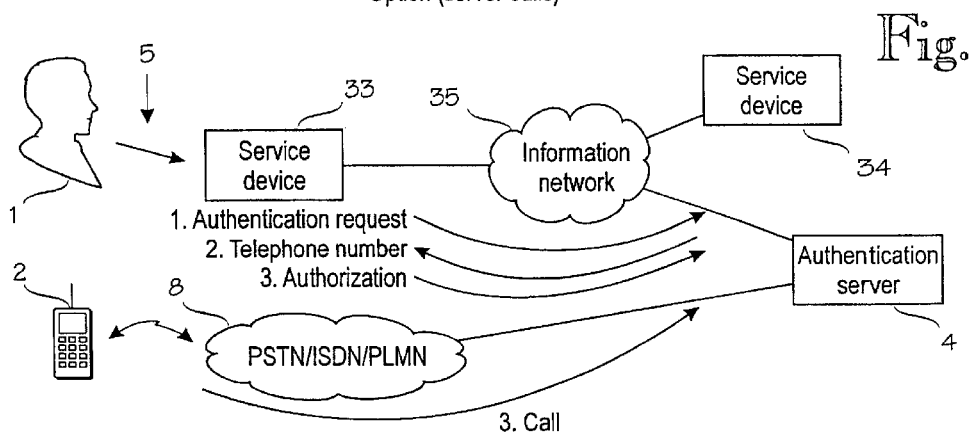
FIG. 3 illustrates a procedure for paying a charge of an automatic service device.

The invention can also be applied to charging for the use of an automatic service device. This is illustrated in FIG. 3. An automatic service device 33 can be e.g. a vending machine providing goods that can be bought by telephone and paid in a telephone bill. The vending machine 33 is connected to the authentication server 4 through a suitable network interface (an information network 36). Also other service devices 34 can be connected to the same authentication device 4 such that payments and access control take place in a centralized manner at the authentication server 4, and not service-device-specifically. The vending machine 33 is provided with a user interface from which the user can select the product he or she wishes to purchase and receive instructions for paying for the product. The user interface of the vending machine 33 thus represents the application communication channel 5 shown in FIG. 1 between the user 1 and the secured system, i.e. the vending machine 33. In the simplest case, the vending machine shows the user the telephone number the user is to call in order to make a purchase. When the user 1 dials this telephone number, the call is routed to the authentication server 4. The authentication server 4 verifies the call and activates the vending machine 33 through a network connection (an information network 35). The user may now select a product to be delivered to him or her by the vending machine.

If the product prices vary in the vending machine 33, a more complex solution is needed. When it is assumed that the vending machine is able to present changing information, the following purchase transaction can be generated with the authentication server 4. First, the user selects a product from the user interface of the service device. Next, the vending machine 33 transmits to the authentication server 4 an authentication request which also indicates the price of the product. From a number space available, the authentication server 4 picks a suitable telephone number which has a call charge corresponding to the price of the product, and returns this telephone number to the vending machine 33 to be shown to the user 1. The user makes a call to the given number by his or her telecommunication device 2, e.g. a mobile telephone. The authentication server 4 verifies the call and authorizes the vending machine to deliver the product to the user. Finally, the authentication server may generate a call charge and deliver it to a local telephone exchange if the exchange is provided with a suitable interface and if it allows such a configuration.

An arrangement according to FIG. 3 also enables e.g. a speech-based service menu to be implemented e.g. for a blind or partially sighted user. Assume that the service device 33 is e.g. an on-line banking terminal. The user 1 inserts his or her bank or credit card into the card reader of the on-line banking terminal. The on-line banking terminal 33 communicates with the authentication server 4 either directly or e.g. via a main computer of the bank. The user 1 is authenticated on the basis of the information read from the card and he or she may also be required to enter a predetermined PIN code through the user interface of the banking terminal. On the basis of the identification information on the card, the user 1 is identified as a user with impaired vision, who, instead of the usual user interface of the banking terminal, uses his or her mobile telephone as the user interface. When the banking terminal 33 detects this, it switches off its display. The user information on the card may also contain the user's mobile telephone number or the mobile telephone number can be retrieved elsewhere from the system. The banking terminal 33 is further connected to the authentication server 4 either directly or via another computer system of the bank. The banking terminal 33 transmits a request to call this mobile telephone number to the authentication server. The authentication server 4 calls the telephone number of the mobile telephone 2 of the user 1, who answers the call. Next, the authentication server 4 gives the user a speech-based menu from which the user is able to select a function he or she wants. The contents of the speech-based service menu may be similar to those ordinarily shown on the display of a banking terminal. The user 1 can select a function either using the keypad of the banking terminal or the keypad of the mobile telephone 2. If the user 1 selects e.g. a balance function, information on the balance is transmitted to the authentication server 4, which presents this information as a speech message. An advantage of such a user interface is that it also enables a person with impaired vision to use a service device with no need for the service device to be provided with any sound reproducing device for presenting speech menus. In addition, using a telephone as the user interface of the service machine ensures that those in the vicinity do not hear the voice prompts and confidential information being given to the user during the service event.

The invention can further be applied to physical access security. A secured building or area requires secondary verification of the identity of a person about to enter. This can be implemented using any of the countless different variations for the purpose; one example of these variations will be given below.

A silent alarm system guards a secured building. No additional keypads or card readers are needed for the access control, except for those that are required for unlocking the locking of a door. Instead, every physical attempt to enter must be confirmed by a call made to the authentication server within a certain period of time, or otherwise an alarm will be given. Those who are about to enter the building must in advance be aware of this procedure. The procedure can be e.g. as follows. A user unlocks a door guarded by an alarm system. The alarm system is connected to the authentication server of the invention, and the alarm system identifies the unlocked door to the authentication server. The authentication server remains waiting for a call to a certain number within a predetermined time. If a call is received within this time, the authentication server verifies that access rights have been granted for the telephone number from which the call is made, and forwards the caller to enter other data, such as the PIN code, into the alarm system for verification. Alternatively, the authentication server itself may verify the entered data, such as the PIN code, and forward the verification result to the alarm system. If a person entering the building has been successfully verified through the call, the alarm system will not enter an alarm state. If no call is received within the predetermined time or the user transmits incorrect data, such as an incorrect PIN code, the authentication server 26 reports the negative verification to the alarm system, which will enter an alarm state.

The identification information or signature for which the authentication server 26 waits could typically be an identifier of the door used and the identifier of those who come and go. If the doors are provided with access control devices equipped with displays, a one-time PIN could be shown to the user as a challenge.

In an embodiment of the invention, it is also possible to integrate location services for mobile stations into the authentication server. The authentication server 26 can verify the fact that the telephone is located close to the door, in which case the authentication server 26 itself can in some cases grant access through the door (unlocking the door) without any keys, key cards or the like.

Other applications of the invention include e.g. purchasing operation time of a web terminal in a web kiosk or a web cafe. The invention also enables a home banking service to be used such that both the one-time personal identification number of the user and the one-time personal identification number given by the service are used in connection with authentication.

In yet another embodiment of the invention, the secured system is a fire wall of a computer system between a public information network (such as the Internet) and a private computer system.

Yet another application of the invention is identification card inactivation. Assume e.g. that the identification card is a card-form identification number generator, which is normally used when logging onto a web page. If the card goes missing, the user should, however, be able to inactivate the card in order to prevent misuse. The user can thus contact the inactivation service of the web site and give his or her username through the channel 5. The inactivation service gives the authentication server 4 an authentication request containing the telephone number of the user. At the same time, the inactivation service gives the user the telephone number of the authentication device, which the user is to call. The user makes a call to the authentication device 4, which verifies that the call originates from a correct number and confirms the user to the inactivation service. Next, the inactivation service accepts the inactivation process of the identification card.

The above description is only intended to illustrate the present invention. The invention is not, however, restricted to the disclosed embodiments but the invention may vary within the scope and spirit of the attached claims.

What is claimed is:

1. An arrangement for authenticating a user of a secured system, the arrangement comprising
 a secured system,
 a user connection to the secured system,
 a telecommunication device in the possession of the user, the telecommunication device having subscriber number A,
 a centralized authentication device being connected to a telephone network and configured to identify a calling subscriber's number from call signalling, the centralized authentication device being further connected to two or more secured systems through information network connections,
 the secured system being configured to, in response to the user logging into the secured system through said user connection, give said authentication device a verification request containing said subscriber number A (10) of the telecommunication device of the user, or an identifier defining such a number,
 subscriber number B associated with said authentication device and known to the user or notified to the user by the secured system through said user connection when the user logs into the secured system,
 said authentication device being configured to, in response to said verification request, await a call coming to said subscriber number B over said subscriber number A from the telephone network, and when a call is received from said subscriber number A to said subscriber number B, said authentication device informs the secured system of a positive verification, or when no call has been received from subscriber number A to subscriber number B within a predetermined time, the device informs the secured system of a failed verification, the secured system being arranged to either provide a secured service to the user or refuse to provide the service on the basis of the positive verification or the failed verification, respectively.

2. An arrangement as claimed in claim 1, wherein, in addition to the authentication of subscriber number A, said authentication device receives from the telephone network information produced by the user over a telephone connection established from said telecommunication device to said authentication device.

3. An arrangement as claimed in claim 2, wherein said authentication device delivers the received information or a corresponding identifier to the secured system in connection with a reply to the verification request.

4. An arrangement as claimed in claim 2, wherein said information comprises one or more of the following: fixed identification code, one-time identification code, biometric data.

5. An arrangement as claimed in claim 4, wherein the secured system generates a one-time identification code and informs the user of said one-time identification code together with said subscriber number B.

6. An arrangement as claimed in claim 1, wherein said subscriber number B is a substantially one-time number selected from a large set of numbers or from a large number space.

7. An arrangement as claimed in claim 1 for authorizing charging for use of the chargeable secured system, wherein the charging is carried out using chargeable subscriber number B.

8. An arrangement as claimed in claim 7, wherein the secured system selects subscriber number B for each charging event from a set of subscriber numbers B, each having a different fixed call charge or each being given a call charge separately for each payment event.

9. An arrangement as claimed in claim 1, wherein said secured system comprises an Internet server, and that said user connection comprises an information network connection between a data terminal of the user and said server.

10. An arrangement as claimed in claim 1, wherein the secured system comprises an automatic service device, and wherein the user connection comprises a user interface of said service device.

11. An arrangement for verifying charging for use of a secured system, the arrangement comprising a secured system, a user connection to the secured system, a telecommunication device in the possession of the user, the telecommunication device having subscriber number A, a centralized authentication device connected to a telephone network and configured to authenticate a calling subscriber's number from call signalling, the authentication device being further connected to two or more secured systems through secured information network connections, the secured system being configured to, in response to the user logging into the secured system through said user connection, informs the user of chargeable subscriber number B and gives said authentication device a verification request, said authentication device being configured to, in response to said verification request, await a call coming to said subscriber number B from the telephone network, said authentication device being configured to, in response to receiving a call to said subscriber number B, give the secured system a positive verification response, the secured system being configured to, in response to the positive verification response, allow the user to use the chargeable service through said user connection.

12. An arrangement as claimed in claim 11, wherein the charging is carried out anonymously using chargeable subscriber number B, which can be allocated to the verification request from a subscriber number B space reserved for the service such that subscriber number A is not delivered in the verification request but the authentication device carries out verification on the basis of any call from any subscriber number received to said subscriber number B.

13. An authentication device connected to a telephone network, the authentication device authenticating a calling subscriber's number from call signalling, wherein the authentication device is connected through secured information network connections to at least two secured systems into which users can login through separate user connections and which are able to verification requests, the authentication device being configured to, in response to a verification request sent by the secured system, containing a subscriber number of a telecommunication device of the user, or an identifier defining such a number, wait a call coming to certain subscriber number B from said subscriber number through the telephone network, and when such a call arrives, said authentication device is configured to give the secured system a positive verification response, or, when no call has been made from the subscriber number to subscriber number B within a predetermined time, the authentication device is configured to give the secured system a negative verification response so that the secured system either provides a secured service to the user or refuses to provide the service on the basis of said positive or negative verification response, and said subscriber number B is either known to the user or notified to the user by the secured system through said user connection.

14. A secured system providing services which are chargeable or which require authentication to a user through a user connection when the user has in his or her possession a telecommunication device provided with subscriber number A, wherein the secured system is through a secured information network connection connected to a centralized authentication device, which is further connected to a telephone network and which authenticates a calling subscriber's number from call signalling, the authentication device is connected through secured information network connections to at least two secured systems that are able to send verification requests, the secured system is configured to, in response to the user logging in through said user connection, give said authentication device a verification request containing said subscriber number A of the telecommunication device of the user, or an identifier defining such a number, and notifies the user of subscriber number B associated with said authentication device through the user connection, which number the user is to call using said telecommunication device, the secured system is configured to, in response to a verification response transmitted by said authentication device to indicate that the authentication device has received a call from said subscriber number A, provides the user with a requested service through the user connection, the secured system is configured to, in response to the verification response transmitted by said authentication device to indicate that the authentication device has not received a call from said subscriber number A during a predetermined period of time, denies the service from the user through the user connection.

15. A system as claimed in claim 14, wherein said secured system comprises an Internet server, and wherein said user connection comprises an information network connection between a data terminal of the user and said server.

16. A system as claimed in claim 14, wherein said secured system comprises an automatic service device, and wherein the user connection comprises a user interface of said service device.

* * * * *